United States Patent [19]

Ryntz, Jr. et al.

[11] 3,813,944

[45] June 4, 1974

[54] MOLTEN METAL SAMPLING DEVICE

[75] Inventors: Edward F. Ryntz, Jr., Warren, Mich.; John F. Janowak, Defiance, Ohio; John F. Watton, Mt. Clemens, Mich.

[73] Assignee: General Motors Corporation, Detroit, Mich.

[22] Filed: Apr. 17, 1972

[21] Appl. No.: 244,596

Related U.S. Application Data

[63] Continuation-in-part of Ser. No. 147,836, May 28, 1971, Pat. No. 3,670,558.

[52] U.S. Cl. ................................ 73/354, 73/17 R
[51] Int. Cl. ...................... G01k 13/12, G01n 25/02
[58] Field of Search ............... 73/354, 17 R, DIG. 9

[56] References Cited
UNITED STATES PATENTS

| | | | |
|---|---|---|---|
| 3,455,164 | 7/1969 | Boyle | 73/DIG. 9 |
| 3,559,452 | 2/1971 | Perbix | 73/17 R |
| 3,643,509 | 2/1969 | Surinx | 73/17 R |

Primary Examiner—Richard C. Queisser
Assistant Examiner—Denis E. Corr
Attorney, Agent, or Firm—Peter P. Kozak

[57] ABSTRACT

A molten metal sampling device adapted for immersion in a heat of molten cast iron treated to form nodular iron on solidification to obtain a sample therefrom upon withdrawal and to generate a cooling curve thereof is disclosed. The device comprises a cylindrical cartridge having vertical walls and a base with a molten metal inlet opening in the vertical walls defining a sampling portion of the cartridge adapted to be filled with molten metal upon immersion to obtain the sample, and a thermocouple extending into the sampling portion having its thermal junction located at the approximate thermal center of the sample for measuring the change in temperature with time as the sample cools. The device is characterized by a critical relationship of design parameters, which are defined.

8 Claims, 5 Drawing Figures

MOLTEN METAL SAMPLING DEVICE

This application is a continuation-in-part of our copending application, Ser. No. 147,836, filed May 28, 1971, and entitled "Rapid Thermal Analysis Method For Predicting Nodular Iron Properties."

This invention relates to a device for the sampling of molten metal and, more particularly, to a device having a critical relationship of design parameters for use in a thermal analysis method of predicting nodular iron properties.

In the above-referenced copending application, there is disclosed a thermal analysis method for rapidly predicting, before the casting thereof, the microstructural and compositional properties of cast nodular iron based on an analysis of the relationship between the shape of a nodular iron cooling curve and metallurgical structure. In practicing the method, a sample of molten cast iron is first extracted from a holding furnace or ladle after the molten cast iron has been suitably inoculated with magnesium and ferrosilicon to form nodular iron on solidification. The sample, after extraction, is allowed to cool and a thermocouple which extends to the thermal center of the sample continuously measures the change in temperature of the sample with time whereby a cooling curve for the sample is generated. This cooling curve is then divided into characteristic curve segments indicative of the nucleation and growth reactions occurring during solidification of the sample. For each of the characteristic curve segments a family of like curve segments obtained in like manner from nodular iron samples of known composition and microstructure are provided. By comparing the characteristic curve segments with their respective families, a series of curve segments representing that member of each family most like each unknown curve segment is determined. This determination and further comparison with a known relationship between families of curve segments and nodular iron metallurgical properties yields the largest range of properties possible for the sample of nodular iron and provides a reliable basis on which to accept or reject the heat of molten cast iron.

In practicing this method, the size and design of the device used to obtain the sample has been found to be critical in generating a cooling curve which will not mask the nucleation and growth reactions occurring in the solidifying cast iron sample but which will provide sensitivity to inflections and arrests in the cooling curve resulting from the reactions occurring on solidification. In addition, since the process is designed to provide a rapid thermal analysis technique, it is highly desirable that the sample cool sufficently fast to provide the required temperature data in less than 2 minutes. In general, we have found the critical features of the cast iron sample and the sampling device to be: sample mass and soundness, sample surface area-to-volume ratio which determines the cooling rate, the wall thickness of the device, and the position of the thermocouple in the sampling device. These features are important in obtaining cooling curves which are responsive to changes in nodular iron processing which in turn affect the resulting microstructure. For example, if the sample is inordinately small resulting in a fast cooling rate, the microstructure will not be indicative of the microstructure encountered in typical castings. For example, possible carbide formation and high graphite nodule counts will result from significantly smaller samples. If the sample is inordinately large resulting in a slow cooling rate, sensitivity to small inflections in the cooling curve representing variations in the microstructure will be lowered or masked. In addition, a slower cooling rate extends the time required in obtaining and analyzing the cooling curve which could result in low pouring temperatures and unacceptable castings.

Accordingly, it is the principal object of this invention to provide a molten metal sampling device for use in a method of rapid thermal analysis of cast iron which will generate cooling curves of samples of the iron indicative of the solidification reactions occurring in the iron on casting.

It is a further object of this invention to provide a molten metal sampling device for use in a method of rapid thermal analysis of cast iron for sampling the iron and generating a cooling curve of the sample which will not mask the nucleation and growth reactions occurring in the solidifying cast iron sample, which will provide sensitivity to inflections and arrests in the cooling curve resulting from the reactions occurring on solidification, and which will cool sufficiently fast to provide the required temperature data, preferably in less than 2 minutes.

Since molten metal sampling devices for generating cooling curves of cast iron samples are not reusable, it is another object of this invention to provide a molten metal sampling device of relatively inexpensive construction which may be easily manufactured.

In the preferred embodiment of our invention, these and other objects are accomplished by providing a molten metal sampling device adapted to be immersed into a holding vessel or ladle containing a heat of molten cast iron treated to form nodular iron on solidification and to withdraw a sample of the iron therefrom immediately before pouring of the heat. The sampling device comprises a cylindrical cartridge having vertical walls and a base formed of a high-melting point material with the walls having a pair of opposed molten metal inlet openings defining a cylindrical sampling portion extending from the base to the inlet openings adapted to be filled with molten metal through the inlets upon immersion and to contain a sample of the cast iron therein upon withdrawal. A thermocouple associated with the cartridge extends into the sampling portion and the cartridge includes means for supporting the thermocouple and for locating the thermal junction thereof at the approximate thermal center of the sample to generate a cooling curve of the sample.

In accordance with the critical nature of our invention, the sampling portion has a wall thickness in the range of one thirty-second to three-sixteenths inch, the ratio of the volume of the sample to the volume of material forming the sampling portion is in the range of about 1.5 to 4.5, and the ratio of the external surface area of the sampling portion to the sum of the volume of the sample and the volume of material forming the sampling portion is in the range of about 3.5 to 6. The sample thus defined is of a size and thermal mass such as to cool from the molten region at about 2,300° F into the solid region at about 1,850° F in less than two minutes thereby providing a rapid thermal analysis device.

Other objects and advantages of our invention will be apparent from the following detailed description, reference being had to the accompanying drawings of which:

Figure 1:
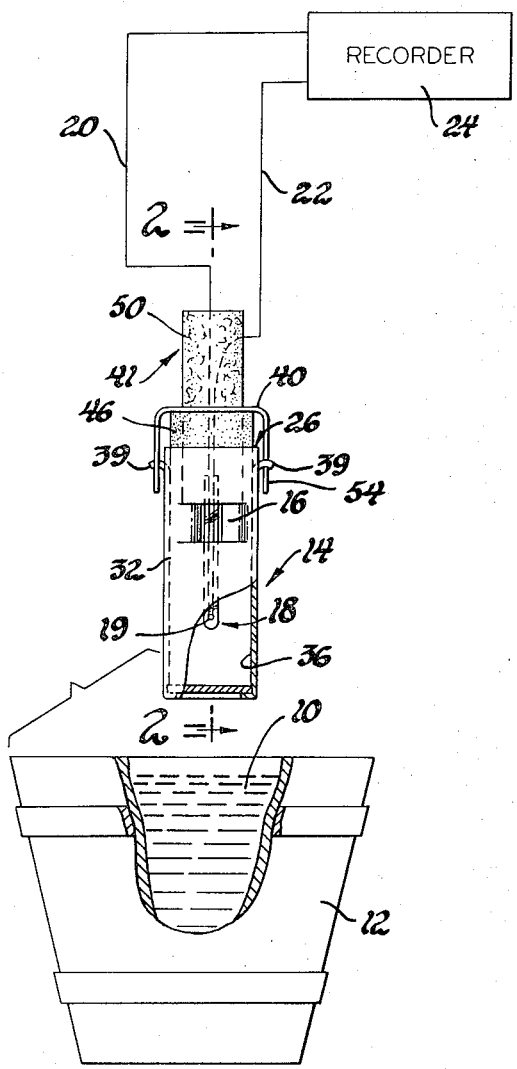
FIG. 1 is a schematic illustration of the sampling technique for extracting a sample from a heat of molten cast iron with the millivolt data from a thermocouple immersed in the sample being fed to a recorder.
Figure 2:
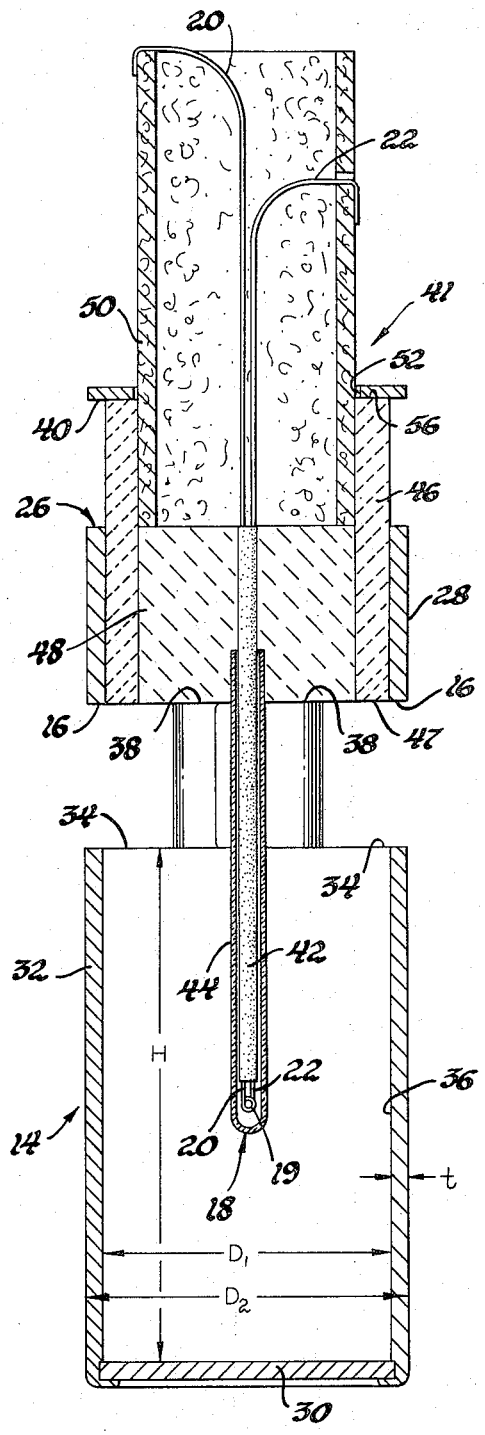
FIG. 2 is a cross-sectional view of the preferred sampling device embodying our invention taken along line 2—2 of FIG. 1 and drawn to 2:1 scale.
Figure 3:
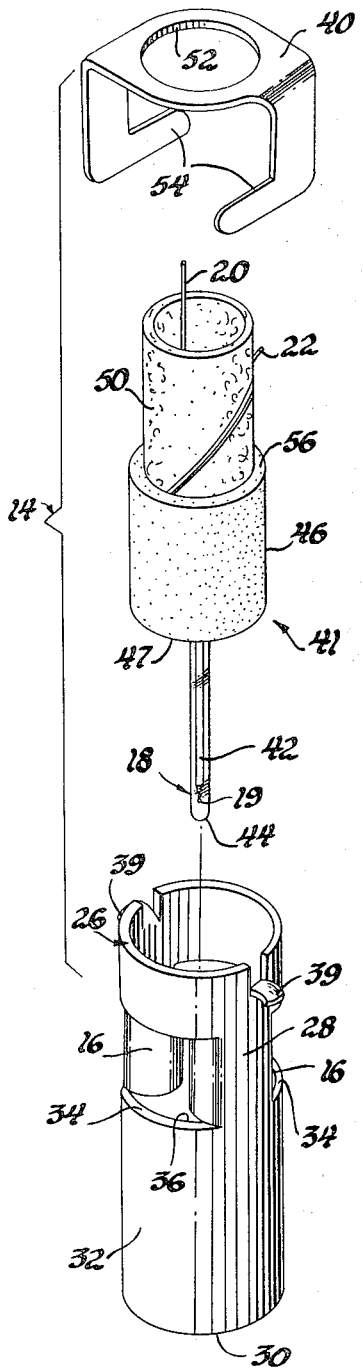
FIG. 3 is an exploded view of the sampling device shown in FIGS. 1 and 2.

Referring now to the drawings and particularly to FIG. 1, a heat of molten cast iron 10 suitably treated with magnesium and ferrosilicon to form nodular iron on solidification is contained in a suitable holding vessel or ladle 12 at a temperature of about 2,600° F immediately prior to the pouring operation. To obtain a sample of molten cast iron from the heat and to generate a cooling curve thereof, a sampling device 14, shown in detail in FIGS. 2 and 3, is immersed in the holding vessel 12 allowing the molten cast iron 10 to flow through inlet openings 16 into the sampling device 14 activating a thermocouple 18 whose thermal junction 19 is located at the approximate thermal center of the sample. After soaking for a few seconds to obtain thermal equilibrium, the sampling device 14 with the sample contained therein is removed and air cooled through the eutectic temperature. Thermocouple leads 20, 22 are connected to a standard strip chart recorder 24 which continuously plots the change in temperature of the cast iron sample as sensed by the thermocouple 18 with time while the sample cools from its molten state to solid state to provide a cooling curve of the cast iron sample extending from about 2,300° to 1,850° F.

Referring now to FIGS. 2 and 3, a preferred form of the sampling device 14 is shown comprising a cylindrical cartridge 26 formed of a material having a metlting point in excess of 2,300° F, e.g., steel or a suitable ceramic. Although a cylindrical cartridge is preferred other cross-sectional configurations may also be used. Preferably a low carbon-low sulphur steel is used to form the cartridge 26. The cylindrical cartridge 26 includes generally vertical walls 28 and a base 30 with the vertical walls having a pair of opposed molten metal inlet openings 16 intermediate the base and the top of the cartridge 26. The inlet openings 16 serve to define a sampling portion 32 of the cartridge 26 extending from the base 30 to the bottom 34 of the inlet openings 16, which limit the height of the sampling portion 32. As may be seen, the sampling portion 32 defines a sample containing volume 36 of height H and diameter $D_1$ adapted to be filled with the molten cast iron 10 through the inlet openings 16 upon immersion whereupon withdrawal of the device 14 from the ladle 12 the sampling portion 32 contains a molten cast iron sample filling the volume 36.

The inlet openings 16 are formed by slitting the vertical walls 28 and crimping the slit metal into the cartridge 26 thus forming a seating portion 38 upon which a thermocouple assembly 41 is supported. The cartridge 26 is also formed with a pair of opposed ears 39 extending outwardly from the top of the cartridge 26 adapted to engage a clip 40 for holding the thermocouple assembly 41 in place, as will hereinafter be more fully explained.

The thermocouple assembly 41 is formed of 24 gauge Chromel-Alumel thermocouple wires 20, 22 insulated from each other by a suitable ceramic tube 42 and sheathed in a 3 mm diameter tube 44 formed of a temperature resistant glass, such as Vycor. The wires 20, 22 are joined at one end to form the thermal junction 19. The ceramic tube 42 and the Vycor tube 44 extend axially into a ceramic sleeve 46 and are cemented therein by means of a suitable ceramic 48. The ceramic sleeve 46 has an outer diameter slightly smaller than diameter $D_1$ such that it may slide into the cartridge 26 with the base 47 thereof engaging and seating on the seating portion 38 of the cartridge 26. Thermocouple wires 20, 22 extend through sleeve 46, and mounted within the ceramic sleeve 46 is a cardboard tube 50 which supports the thermocouple wires 20, 22 and allows for a quick connect and disconnect of the respective wires 20, 22 with the recorder 24.

Referring now particularly to FIG. 3, in constructing the sampling device 14, inlet openings 16 are formed in the vertical walls 28 intermediate of the base 30 and the top of the cylindrical cartridge 26 by slitting the walls and crimping the metal inwardly of the cartridge thus defining the sampling portion 32 having a molten metal sample containing volume 36 extending from the base 30 to the bottom 34 of the inlet openings 16. The opposed ears 39 are similarly formed by slitting the cartridge 26 and pulling the slit metal portions downwardly and outwardly.

The thermocouple assembly 41 is then inserted into the cartridge 26 with the sheathed thermocouple portion extending into the samplng portion 32. The length of the thermocouple from the thermal junction to the base 47 of the ceramic sleeve 46 is so designed that when the base 47 of sleeve 46 seats on the seating portion 38, the thermal junction 19 is located at the approximate geometric center of the sampling portion 32 which corresponds to the approximate thermal center of the molten metal sample.

After inserting the thermocouple assembly 41 in the cartridge 26, the sheet metal clip 40 is engaged to hold the assembly 41 securely in place. The clip 40 includes a hole 52 of a diameter slightly larger than the cardboard tube 50 but smaller than the outer diameter of the ceramic sleeve 46 such that the clip 40 slides down around the tube 50 resting on the top surface 56 of sleeve 46 (FIG. 2). The clip 40 also includes opposed, oppositely extending arms 54 which engage ears 39 when the clip is rotated into engagement therewith thus securely holding the thermocouple assembly 41 in the cartridge 26 and against the seating portion 38 such that the thermal junction 19 remains located at the approximate geometric center of the sample during the immersion, filling, and cooling procedures.

As mentioned above, in practicing a method of rapid thermal analysis of cast iron it is critical that the size and design of the sampling device be such as to generate a cooling curve of a cast iron sample indicative of the microstructure actually encountered in the castings. The device must be responsive to changes in nodular iron processing, must not mask the nucleation or growth reactions occurring in the solidifying cast iron sample, must provide sensitivity to inflections and arrests in the cooling curve resulting from the reactions occurring on solidification, and must define a sample which will cool sufficiently fast to provide the required temperature data, preferably in less than two minutes. We have found that a definite and critical relationship between wall thickness, height, and diameter of the sampling portion 32 exists and must be met to achieve these requirements. More specifically, we have found that the wall thickness of the sampling portion, the ratio of the volume of the sample to the volume of material forming the sampling portion, and the ratio of the external surface area of the sampling portion to the sum of the volume of the sample and the volume of material forming the sampling portion to be critical parameters.

Figure 4:
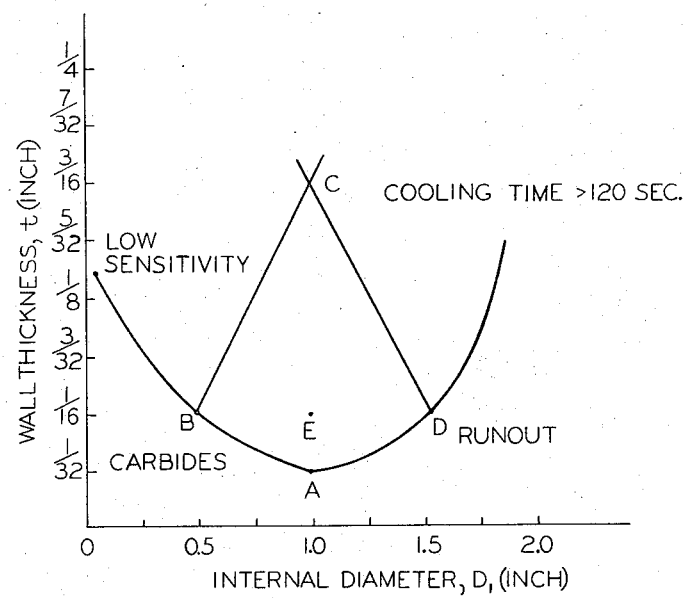
FIG. 4 is a graph of wall thickness of the sampling device versus internal diameter of the sampling device.

Referring now to FIG. 4, there is shown the relationship between the wall thickness (t in FIG. 2) and the internal diameter of the sampling portion ($D_1$ in FIG. 2) of the device for a sample 1 ¾ inch high (H in FIG. 2). If both wall thickness and the sample are inordinately small (bottom left portion of FIG. 4) resulting in a fast cooling rate, carbides will form in the sample producing a cooling curve not indicative of the microstructure encountered in typical castings. If the wall thickness is large and the sample small (upper left), there will be low sensitiviity to subtle inflections and arrests in the cooling curve resulting from the reactions occurring on solidification. If both the wall thickness and the sample are inordinately large (upper right), resulting in a slow cooling rate, the time required in obtaining and analyzing the cooling curve becomes excessive resulting in low pouring temperatures and unacceptable castings. In addition, sensitivity to small inflections in the cooling curve representing variations in the microstructure will be lowered or masked. If the wall thickness is small and the sample large (bottom right), meltthrough or runout of the sample through the sampling device is likely. Accordingly, it has been found that the wall thickness of the sampling portion should be in the range of one thirty-second to three-sixteenths inch and that the wall thickness, t, lie in the bounded area ABCD of FIG. 4 in relation to the internal diameter, $D_1$. In the preferred embodiment of our invention, as shown in FIG. 2, the wall thickness, t, of the sampling portion 32 is one-sixteenth inch and the internal diameter, $D_1$, is about 1 inch, which corresponds to point E in FIG. 4.

Figure 5:
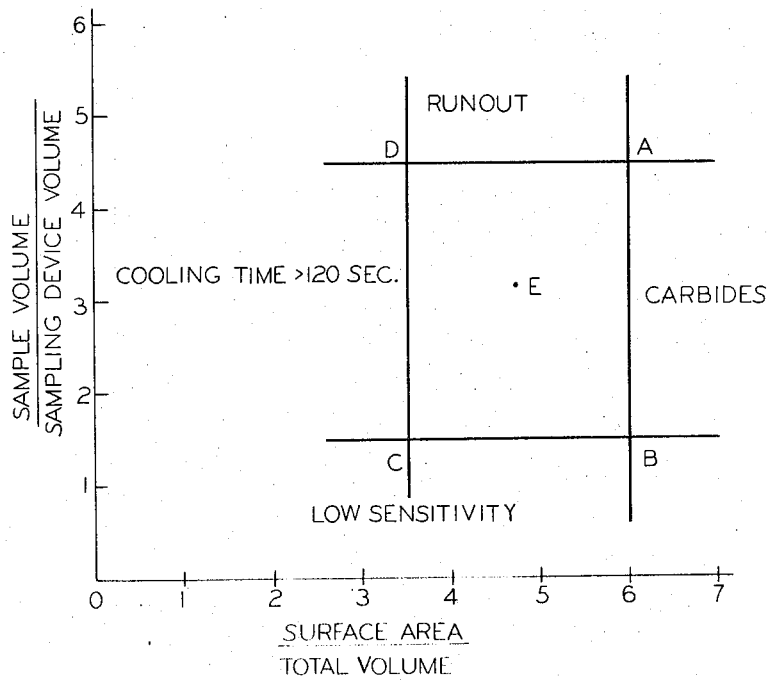
FIG. 5 is a graph of the ratio of sample volume to sampling device volume versus the ratio of the surface area of the sampling device to the sum of sample volume and sampling device volume.

Referring now to FIG. 5, there is shown a graph which interrelates all of the critical parameters, in addition to wall thickness. That is, on the ordinate is the ratio of the volume of the cast iron sample, which is a function of height H and internal diameter $D_1$ of sampling portion 32 (FIG. 2) to the volume of material forming the sampling portion 32 which is a function of height H, diameter $D_1$, and wall thickness t including the base 30. On the abscissa is the ratio of the external surface area of the sampling portion, which is a function of height H and outer diameter $D_2$ to the total volume which is defined as the sum of the volume of the sample and the volume of material forming the sampling portion.

The surface area-to-volume ratio is a measure of cooling rate and, as discussed above in relation to FIG. 4, large ratios of surface area-to-volume result in excessive cooling rates and the formation of carbides while small ratios of surface area-to-volume result in excessive cooling times and lowering or masking of small inflections. On the ordinate, large ratios of sample volume-to-sampling device volume result in runouts while small ratios result in low sensitivity. Accordingly, we have found that the sampling device embodying our invention must have a ratio of sample volume to sampling device volume within the range of about 1.5 to 4.5 and a surface area-to-volume ratio within the range of about 3.5 to 6. In terms of FIG. 5, the coordinates of the respective ratios must lie in the area bounded by line ABCD. The preferred embodiment of the invention, as shown in FIG. 2, having a wall thickness, t, of one-sixteenth inch, and internal diameter, $D_1$, of 1 inch, an outer diameter, $D_2$, of 1 ⅛ inch, and a height, H, of 1 ¾ inch lies at point E of FIG. 5.

Although our invention has been described in terms of certain specific embodiments, it will be recognized by those skilled in the art that other forms may be adopted within the scope of the invention.

We claim:

1. A molten metal sampling device adapted to be immersed into direct contact with a heat of molten cast iron treated to form nodular iron on solidification to obtain a sample of said iron upon withdrawal from said heat to generate a cooling curve of said sample, comprising a totally metal cartridge having vertical walls and a base formed of a material having a melting point in excess of 2,300°F, the exterior of said cartridge being bare and adapted to be immersed in direct contact with said heat, said vertical walls having a molten metal inlet opening intermediate said base and the top of said cartridge defining a sampling portion extending from said base to said opening adapted to be filled with said molten metal through said inlet opening upon immersion to obtain said sample, the walls of said sampling portion and said base having a thickness in the range of about one thirty-second to three-sixteenths inch; and a thermocouple associated with said cartridge extending into said sampling portion and having its thermal junction located at the approximate geometric center of said sampling portion, the ratio of the volume of said sample to the volume of material forming said sampling portion being in the range of about 1.5 to 4.5 and the ratio of the external surface area of said sampling portion to the sum of the volume of said sample and the volume of material forming said sampling portion being in the range of about 3.5 (in.$^{-1}$) to 6 (in.$^{-1}$).

2. A molten metal sampling device adapted to be immersed into direct contact with a heat of molten cast iron treated to form nodular iron on solidification to obtain a sample of said iron upon withdrawal from said heat to generate a cooling curve of said sample, comprising a totally metal cartridge having vertical walls and a base formed of a material having a melting point in excess of 2,300°F, the exterior of said cartridge being bare and adapted to be immersed in direct contact with said heat, said vertical walls having a molten metal inlet opening intermediate said base and the top of said cartridge defining a sampling portion extending from said base to said opening adapted to be filled with said molten metal through said inlet opening upon immersion to obtain said sample, said sample having a thermal mass such as to cool from about 2,300° to 1,850°F in less than two minutes, the walls of said sampling portion and said base having a thickness in the range of about one thirty-second to three-sixteenths inch; and a thermocouple associated with said cartridge extending into said sampling portion and having its thermal junction located at the approximate geometric center of said sampling portion, the ratio of the volume of said sample to the volume of material forming said sampling portion being in the range of about 1.5 to 4.5 and the ratio of the external surface area of said sampling portion to the sum of the volume of said sample and the volume of material forming said sampling portion being in the range of about 3.5 (in.$^{-1}$) to 6 (in.$^{-1}$).

3. A molten metal sampling device adapted to be immersed into direct contact with a heat of molten cast iron treated to form nodular iron on solidification to obtain a sample of said iron upon withdrawal from said heat to generate a cooling curve of said sample, comprising a totally metal cartridge having vertical walls and a base formed of a material having a melting point in excess of 2,300°F, the exterior of said cartridge being bare and adapted to be immersed in direct contact with said heat, said vertical walls having a pair of opposed molten metal inlet openings intermediate said base and the top of said cartridge defining a sampling portion extending from said base to said openings adapted to be filled with said molten metal through said inlet openings upon immersion to obtain said sample, the walls of said sampling portion and said base having a thickness in the range of about one thirty-second to three-sixteenths inch; a thermocouple extending into said sampling portion; and means associated with said cartridge for supportingly engaging said thermocouple and for locating its thermal junction at the approximate geometric center of said sampling portion, the ratio of the volume of said sample to the volume of material forming said sampling portion being in the range of about 1.5 to 4.5 and the ratio of the external surface area of said sampling portion to the sum of the volume of said sample and the volume of material forming said sampling portion being in the range of about 3.5 (in.$^{-1}$) to 6 (in.$^{-1}$).

4. A molten metal sampling device adapted to be immersed into direct contact with a heat of molten cast iron treated to form nodular iron on solidification to obtain a sample of said iron upon withdrawal from said heat to generate a cooling curve of said sample, comprising a totally metal cartridge having vertical walls and a base formed of a material having a melting point in excess of 2,300°F, the exterior of said cartridge being bare and adapted to be immersed in direct contact with said heat, said vertical walls having a pair of opposed molten metal inlet openings intermediate said base and the top of said cartridge defining a sampling portion extending from said base to said openings adapted to be filled with said molten metal through said inlet openings upon immersion to obtain said sample, the walls of said sampling portion and said base having a thickness in the range of about one thirty-second to three-sixteenths inch; a thermocouple axially mounted in a cylindrical ceramic sleeve adapted for insertion into said cartridge comprising a pair of spaced, electrically insulated thermocouple wires sheathed in a temperature resistant glass tube and joined at one end to form a thermal junction, the respective opposite ends of said wires extending through said sleeve forming terminal leads; means associated with said cartridge for supportingly engaging said sleeve with said thermocouple extending into said sampling portion and for locating said thermal junction at the approximate geometric center of said sampling portion; and clip means for holding said sleeve with said thermocouple mounted therein in said cartridge and in engagement with said means for supporting said sleeve; the ratio of the volume of said sample to the volume of material forming said sampling portion being in the range of about 1.5 to 4.5 and the ratio of the external surface area of said sampling portion to the sum of the volume of said sample and the volume of material forming said sampling portion being in the range of about 3.5 (in.$^{-1}$) to 6 (in.$^{-1}$).

5. A molten metal sampling device adapted to be immersed into direct contact with a heat of molten cast iron treated to form nodular iron on solidification to obtain a sample of said iron upon withdrawal from said heat to generate a cooling curve of said sample, comprising a cylindrical totally steel cartridge having vertical walls and a base and an internal diameter of about 1 inch, the exterior of said cartridge being bare and adapted to be immersed in direct contact with said heat, said vertical walls having a pair of opposed molten metal inlet openings intermediate said base and the top of said cartridge defining a cylindrical sampling portion about 1¾ inch in height extending from said base to said openings adapted to be filled with said molten metal through said inlet openings upon immersion to obtain said sample, the walls of said sampling portion and said base having a thickness of about one-sixteenth inch; and a thermocouple associated with said cartridge extending into said sampling portion and having its thermal junction located at the approximate geometric center of said sampling portion.

6. A molten metal sampling device adapted to be immersed into direct contact with a heat of molten cast iron treated to form nodular iron on solidification to obtain a sample of said iron upon withdrawal from said heat to generate a cooling curve of said sample, comprising a cylindrical totally steel cartridge having vertical walls and a base and an internal diameter of about 1 inch, the exterior of said cartridge being bare and adapted to be immersed in direct contact with said heat, said vertical walls having a pair of opposed molten metal inlet openings intermediate said base and the top of said cartridge defining a cylindrical sampling portion about 1¾ inch in height extending from said base to said openings adapted to be filled with said molten metal through said inlet openings upon immersion to obtain said sample, the walls of said sampling portion and said base having a thickness of about one-sixteenth inch; a thermocouple axially mounted in a cylindrical ceramic sleeve adapted for insertion into said cartridge comprising a pair of spaced, electrically insulated thermocouple wires sheathed in a temperature resistant glass tube and joined at one end to form a thermal junction, the respective opposite ends of said wires extending through said sleeve forming terminal leads; means associated with said cartridge for supportingly engaging said sleeve with said thermocouple extending into said sampling portion and for locating said thermal junction at the approximate geometric center of said sampling portion; and clip means for holding said sleeve with said thermocouple mounted therein in said cartridge and in engagement with said means for supporting said sleeve.

7. A molten metal sampling device adapted to be immersed into direct contact with a heat of molten cast iron treated to form nodular iron on solidification to obtain a sample of said iron upon withdrawal from said heat for the generation of a cooling curve of said sample, comprising a totally metal cartridge having vertical walls and a base formed of a material having a melting point in excess of 2,300°F, the exterior of said cartridge being bare and adapted to be immersed in direct contact with said heat, said vertical walls having a molten metal inlet opening intermediate said base and the top of said cartridge defining a sampling portion extending from said base to said opening adapted to be filled with said molten metal through said inlet opening upon immersion to obtain said sample, the walls of said sampling portion and said base having a thickness in the range of about one thirty-second to three-sixteenths inch; said cartridge being adapted to receive a thermocouple and including means for supporting said thermocouple and locating its thermal junction at the approximate geometric center of said sampling portion, the ratio of the volume of said sample to the volume of material forming said sampling portion being in the range of about 1.5 to 4.5 and the ratio of the external surface area of said sampling portion to the sum of the volume of said sample and the volume of material forming said sampling portion being in the range of about 3.5 (in.$^{-1}$) to 6 (in.$^{-1}$).

8. A molten metal sampling device adapted to be immersed into direct contact with a heat of molten cast iron treated to form nodular iron on solidification to obtain a sample of said iron upon withdrawal from said heat for the generation of a cooling curve of said sample, comprising a cylindrical totally steel cartridge having vertical walls and a base and an internal diameter of about 1 inch, the exterior of said cartridge being bare and adapted to be immersed in direct contact with said heat, said vertical walls having a pair of opposed molten metal inlet openings intermediate said base and the top of said cartridge defining a cylindrical sampling portion about 1¾ inch in height extending from said base to said openings adapted to be filled with said molten metal through said inlet openings upon immersion to obtain said sample, the walls of said sampling portion and said base having a thickness of about one-sixteenth inch; said cartridge being adapted to receive a thermocouple and including means for supporting said thermocouple and locating its thermal junction at the approximate geometric center of said sampling portion.

* * * * *